(12) United States Patent
Beukema

(10) Patent No.: US 6,243,413 B1
(45) Date of Patent: Jun. 5, 2001

(54) MODULAR HOME-NETWORKING COMMUNICATION SYSTEM AND METHOD USING DISPARATE COMMUNICATION CHANNELS

(75) Inventor: Troy J. Beukema, Peekskill, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/055,176

(22) Filed: Apr. 3, 1998

(51) Int. Cl.[7] ........................................... H04L 5/16
(52) U.S. Cl. .................. 375/222; 375/220; 375/140; 370/311; 455/432
(58) Field of Search .................. 375/140, 141, 375/220, 222; 455/3.3, 270; 370/464, 465, 466, 467; 340/310.01, 310.02; 709/206, 230, 238, 250

(56) References Cited

U.S. PATENT DOCUMENTS

| | | | |
|---|---|---|---|
| 5,371,734 | * 12/1994 | Fischer | 370/311 |
| 5,504,454 | * 4/1996 | Daggett et al. | 329/304 |
| 5,633,868 | * 5/1997 | Baldwin et al. | 370/331 |
| 5,748,619 | * 5/1998 | Meier | 370/278 |
| 5,889,816 | * 3/1999 | Agrawal et al. | 375/220 |
| 5,960,344 | * 9/1999 | Mahany | 455/432 |

\* cited by examiner

Primary Examiner—Stephen Chin
Assistant Examiner—Shuwang Liu
(74) Attorney, Agent, or Firm—F. Chau & Associates, LLP

(57) ABSTRACT

A modular home-networking communications system which uses a physical layer modulation scheme suitable for transmission in both RF and powerline communication channels. The modulation system is based on direct-sequence spread-spectrum (DS-SS) using Barker codes to spread the information symbols, which provides both operation at low signal to noise ratio and very good resistance to time dispersion distortion due to the excellent autocorrelation properties of the Barker codes. This type of modulation system is ideal for the powerline communications channel since it spreads the transmission power over a wide range of frequency, lowering the power spectral density enough that it will provide long distance coverage without violating FCC radiated emission and conducted power regulations.

17 Claims, 8 Drawing Sheets

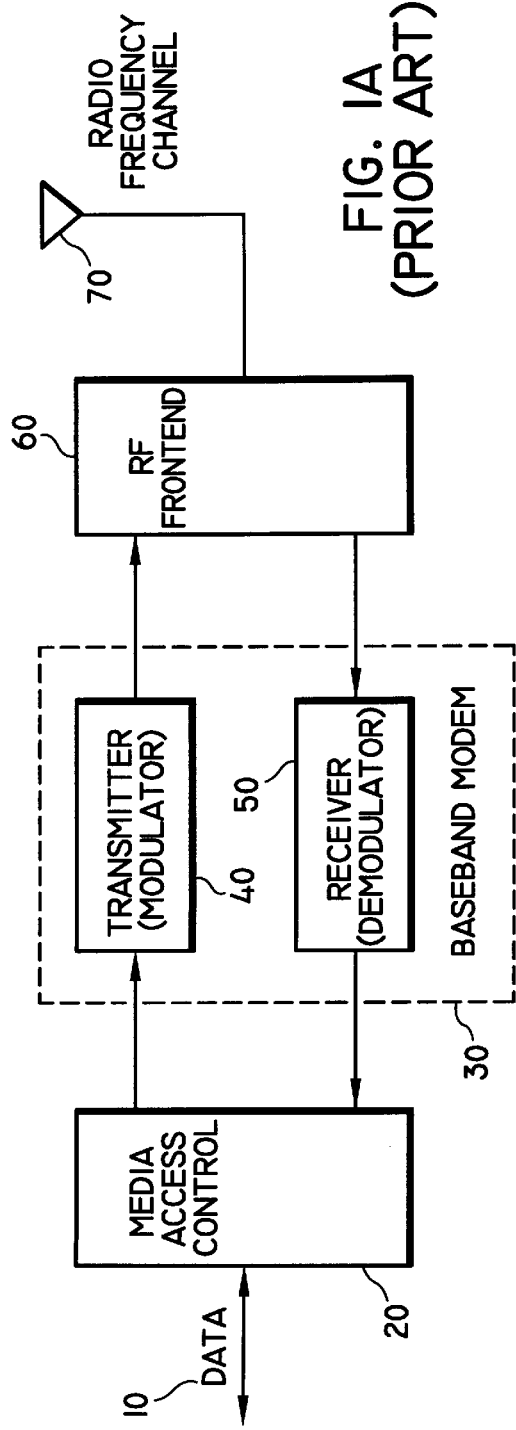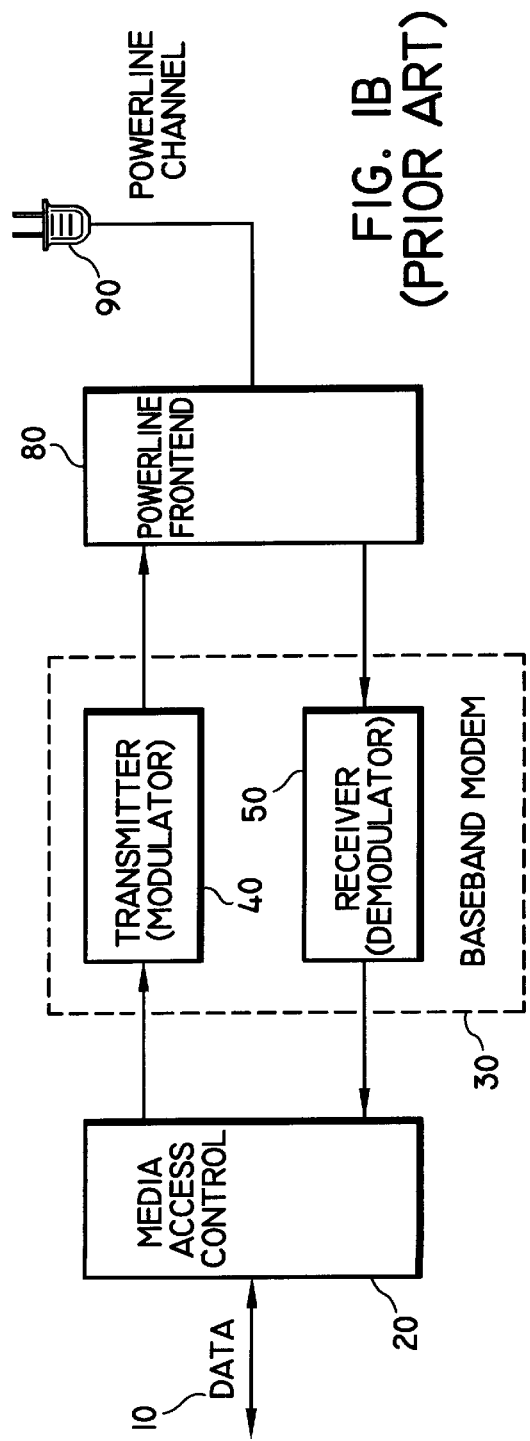

MODULAR HOME-NETWORKING COMMUNICATION SYSTEM AND METHOD USING DISPARATE COMMUNICATION CHANNELS

BACKGROUND OF THE INVENTION

1. Technical Field of the Invention

The present invention relates to system and methods for providing modular home-networking communication and, more specifically, to a modular home network communications system which employs a common physical layer modulation and a common media access protocol which are compatible with disparate communication channels such as radio frequency (RF) and powerline communication channels, and a method for implementing the same.

2. Description of Related Art

Currently, one of the newest trends in the personal computer (PC) industry involves Home Networking. Specifically, the ability to inexpensively and reliably interconnect multiple computers, peripherals, and/or appliances within a home without having to install ethernet or twisted pair backbone wiring is a strongly desired goal for home networking device OEMs. In furtherance of this goal, both wireless solutions and powerline solutions have been considered as the physical layer backbone for the home network system.

Conventional powerline networks generally operate with data rates ranging from about 10 kbps to 350 kbps. For example, one such system, which is disclosed in U.S. Pat. No. 4,815,106 to Propp, et al. entitled "Powerline Communication Apparatus", operates at a data rate of 100 kbps using a complicated equalizer/coding scheme. The disadvantage with this system, however, is its low data rate and its high implementation complexity which results in excessive costs. It has recently been determined that a 350 kbps powerline network system based on traditional frequency modulation (FM) methods such as binary frequency shift keying (BFSK) may be achieved. However, system performance will degrade as the data rate increases past 350 kbps in a time dispersive/noisy communication channel such as the powerline channel. Indeed, for applications such as remote printing and file sharing, it is desirable to operate with a data rate of at least 1 Mbps. Consequently, a modulation system for use in a powerline communication channel which is inexpensive and can easily be implemented, and which operates with a data rate in the range of 1 Mbps, is highly desirable.

Next, although conventional wireless network communication systems generally operate at a maximum data rate of around 2 Mbps in the 2.4 GHz ISM (Industrial, Scientific and Medical) frequency band, these systems can be very costly. Notwithstanding its potentially high cost, a wireless network communication system advantageously provide mobility to the network device and as such, may be the preferred network infrastructure if mobility is a priority for the end user.

In view of the advantages and disadvantages discussed above for both the wireless and powerline network solutions, it is not clear that one single solution, either wireless or powerline, will provide the optimum network technology to meet the need of a wide range of disparate users. Therefore, there currently exists a strong need in the PC home-networking industry to provide a versatile home-networking architecture using a common baseline technology which can support both powerline interconnect and wireless interconnect architecture, and which is inexpensive and easily implementable.

SUMMARY OF THE INVENTION

It is an object of the present invention to provide a home-networking modulation system which is compatible with disparate communication channels such as the wireless and powerline physical layer communication medium.

It is another object of the present invention to provide a common home-networking modulation system which operates at a low signal to noise ratio and is robust to time dispersion distortion in both the RF and powerline environments.

It is yet another object of the present invention to provide a home-networking communications system which allows an end user to select either RF or powerline connectivity, or both, while using a common baseband processing unit and media access control protocol.

In one aspect of the present invention, a modular home-network communications system comprises: a network device; a plurality of channel interface units for operatively interfacing the network device to one of a plurality of disparate communication channels, each of the plurality of channel interface units being operatively compatible with a corresponding one of the plurality of disparate communication channels; modulation/demodulation means, operatively connected to one of the plurality of channel interface units, for encoding and decoding data transmitted between the network device and one of the plurality of disparate communication channels, the modulation/demodulation means being operatively compatible with each of the plurality of disparate communication channels; and media access protocol means, operatively connected between the network device and the modulation/demodulation means, for controlling the transfer of data between the network device and the modulation/demodulation means, the media access protocol means being operatively compatible with each of the plurality of disparate communication channels; whereby the network device may be interchangeably connected between each of the plurality of disparate communication channels by connecting the modulation/demodulation means to the corresponding one of the plurality of channel interface units.

The present invention is directed to a modular home-networking communication architecture which utilizes a common modulation system so that an end user is afforded the flexibility to configure the home network to simultaneously utilize a plurality of disparate communication channels (or easily switch between them) such as RF and/or powerline channels. Research performed by the present inventor has revealed that a direct-sequence spread-spectrum (DS-SS) modulation system will provide high-speed operation at a low signal to noise ratio with very good resistance to time dispersion distortion when the coding sequence used to spread information symbols (such as Barker codes) has sufficient autocorrelation properties. Consequently, by using the DS-SS based physical layer modulation, it is possible to provide a viable, high performance modular home-networking architecture which can support both wireless and powerline network devices.

Advantageously, the DS-SS modulation system is relatively inexpensive and simple to implement. The DS-SS modulation system may be used in the ISM band to provide a 2 Mbit data rate for wireless (RF) network connectivity. Furthermore, the present inventor has determined (through an analysis of the characteristics of the powerline channel) that the DS-SS modulation system is well adapted for use in the powerline channel, which is highly dispersive and noisy, since DS-SS can operate at a low signal to noise ratio and is robust to time dispersion distortion of signals transmitted on the powerline medium. Moreover, the DS-SS technology has proven to be capable of supporting a data rate of 1 Mbps over a typical powerline channel in a home environment. Equally important is that the DS-SS modulation system is particularly ideal for the powerline communication channel since it spreads the transmission power over a wide range of frequency, thereby lowering the power spectral density such that it will provide long distance coverage without violating FCC radiated emission and conducted power regulations.

These and other objects, features and advantages of the present invention will become apparent from the following detailed description of illustrative embodiments, which is to be read in connection with the accompanying drawings.

BRIEF DESCRIPTION OF THE DRAWINGS

FIGS. 1(a) and (b) are block diagrams of conventional digital communication systems for transmitting digital data through a radio frequency (RF) channel and a powerline channel, respectively, which are utilized in accordance with the present invention;

DETAILED DESCRIPTION OF PREFERRED EMBODIMENTS

Figure 2:
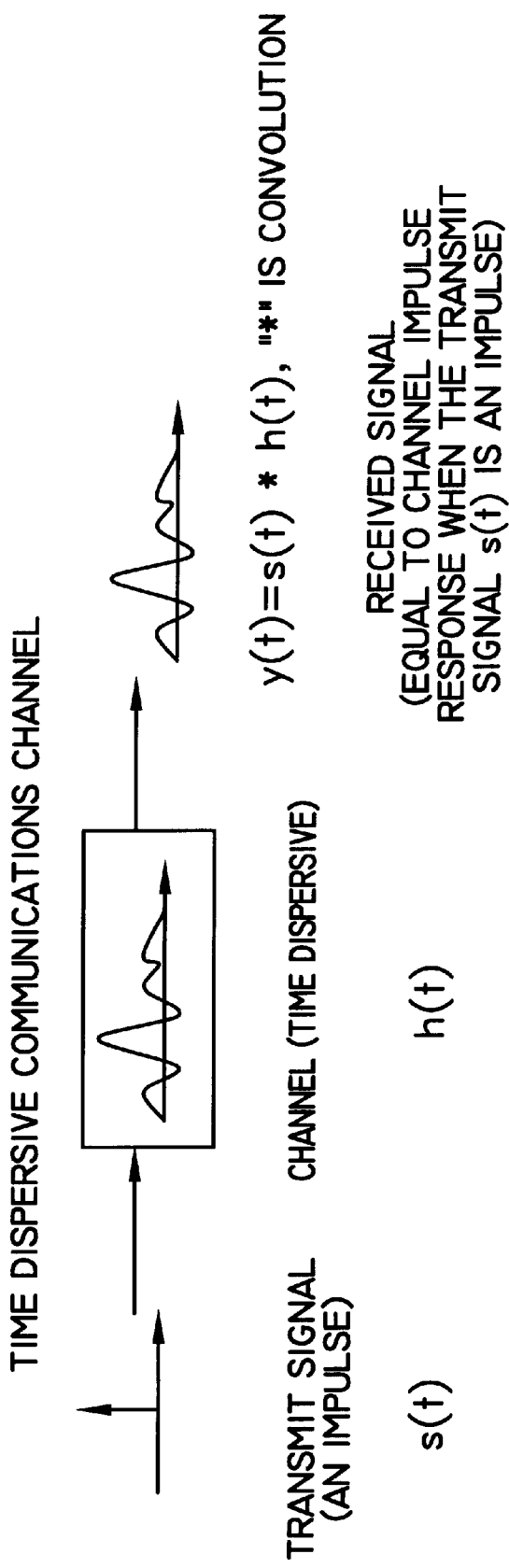
FIG. 2 is a diagram illustrating a time domain impulse response of a dispersive communication channel.

It is to be understood that same or similar components illustrated throughout the figures are designated with the same reference numeral. Referring to FIG. 1(a), a block diagram of a conventional digital communications system for transmitting and receiving data 10 to and from a radio frequency channel via antenna 70 is shown. The system includes a media access control (MAC) module 20 which is a data link sublayer that is responsible for transferring data 10 to and from the physical layer and, as discussed in detail below, it provides the protocol and control to allow multiple access to the shared communications medium in accordance with the present invention. A baseband modem 30 (or baseband processor) having a transmitter (modulator) 40 and a receiver (demodulator) 50 is operatively connected to the MAC module 20. The transmitter 40 of the baseband modem 30 translates data 10 received from the MAC module 20 to a baseband modulation signal suited for transmission on the RF channel. An RF front end 60, operatively connected between the baseband modem 30 and the antenna 70, translates the baseband modulation from the baseband modem 30 to a microwave frequency for transmission through the RF channel via the antenna 70 (which couples the RF energy onto the RF channel). In receive mode, the RF front end 60 operatively connects a signal received by the antenna 70 from the RF channel to the baseband modem 30 by translating the received microwave signal to baseband signals suitable for analysis by the demodulator 50 of the baseband modem 30.

Referring now to FIG. 1(b), a block diagram of a conventional digital communication system for transmitting and receiving digital data to and from a powerline communication channel 90 is shown. The system shown in FIG. 1(b) is similar to the system shown in FIG. 1(a) except that the system in FIG. 1(b) includes a powerline front end 80 (instead of the RF front end 60) for providing an interface between the baseband modem 30 and a powerline communication channel 90. It is to be understood that the systems shown in FIGS. 1(a) and (b) operate in a same manner, except that the powerline front end 80 translates the baseband modulation signal from the baseband modem 30 to a frequency which is suitable for transmission on the powerline communication channel 90, while providing high voltage isolation from the powerline channel 90.

It is to be appreciated that since the systems of FIGS. 1(a) and 1(b) are similar to each other, and since the RF front end 60 of FIG. 1(a) and the powerline front end 80 of FIG. 1(b) are similar to each other, it is possible to combine the systems shown in FIGS. 1(a) and 1(b) to form a modular home-networking system in which either the RF front end 60 or the powerline front end 80, or both, may be interchangeably utilized with the same baseband modem 30 and MAC module 20 (as discussed in further detail below). One problematic issue with such a combination is the selection of a modulation system in the baseband modem 30 which is suited for transmission on both the powerline channel and the RF channel. Through extensive research and experimentation, the present inventor has determined that a direct-sequence spread-spectrum (DS-SS) modulation system using spreading codes with good time domain autocorrelation properties is well-adapted for use in the powerline channel, as well as the RF channel.

DS-SS Modulation Using Barker-Class Spreading Codes in a Time-Dispersive Channel Currently, the DS-SS technology is being implemented in wireless network applications in the ISM frequency band to provide 2 Mbit wireless network connectivity and as such, is well known to those skilled in the art. Therefore, the following discussion of preferred embodiments will focus on the applicability and advantages of the DS-SS modulation technology as it is applied to dispersive communication channels such as the powerline channel.

In general, a powerline communication channel is characterized by a large amount of time dispersion distortion. Specifically, a signal which is transmitted in a time dispersive channel will be "smeared out" in time and tend to "interfere with itself". This concept is illustrated in FIG. 2 with an example of an impulse response h(t) of a time dispersive communication channel. In general, the impulse response of a communication channel is that response which is seen at the receiver end of such channel when a time domain impulse is applied to the transmitter end of such channel. Mathematically, the transmitted signal s(t) is convolved with the impulse response of the channel h(t). As shown in FIG. 2, the output signal y(t) results from a mathematical convolution of a transmitted signal s(t) with the impulse response h(t) of the channel. When the input signal s(t) is a impulse, the output signal y(t) is the impulse response h(t) of the communication channel.

Figure 3:
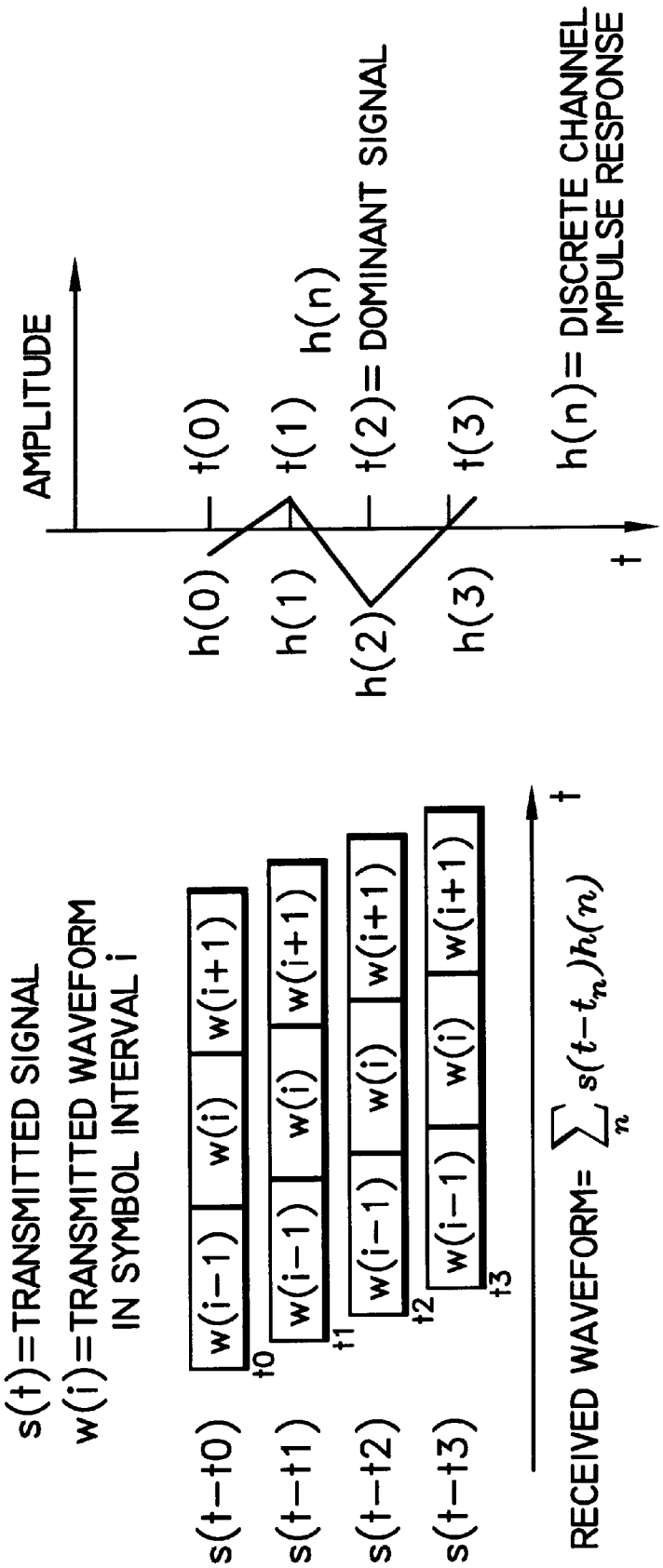
FIG. 3 is a diagram illustrating multipath distortion in a dispersive channel.

Consequently, when a modulated signal is sent through a time dispersive channel, time adjacent symbols are smeared into each other, causing system degradation referred to as "Inter Symbol Interference" (or ISI). The term "symbol" refers to the transmitted modulation waveform which represents encoded binary data. The ISI puts a fundamental limit on the data rate which may be obtained in the channel, unless steps are taken to combat the "self interference" degradation resulting from the ISI. This concept is illustrated in FIG. 3, which shows the formation of the received signal as a summation of time shifted and scaled replicas of the transmitted signal s(t). It is to be understood that the term w(i) illustrates a single symbol interval, where "w" refers to a transmitted modulation waveform pattern and w(i) refers to that pattern multiplied by the complex sign corresponding to the binary input data in symbol interval "i". For instance in the preferred embodiment which uses a DS-SS QPSK system, the transmitted baseband symbols are Barker patterns multiplied by a complex sign which encodes two bits of information per symbol time. The sequence of symbols w(i−1), w(i), w(i+1) . . . represent the modulation signal s(t). Further, for illustration purposes, a discrete-time impulse response h(n) is shown at four time points (i.e., h(0), h(1), h(2) and h(3)). It can easily be seen in FIG. 3 that the time dispersion effect causes the transmitted signal s(t) to interfere with itself. For instance, FIG. 3 shows that the energy from the transmitted symbol interval w(i−1) at time delay t3 (i.e. w(i−1) of the transmitted signal s(t−t3)) significantly overlaps with energy from the transmitted symbol interval w(i) at time delay to (i.e., w(i) of the transmitted signal s(t−t0)).

There are conventional modulation techniques that are well known to those skilled in the art which may be deployed to remedy the ISI problem discussed above. For instance, equalization (i.e. via an equalizer) or orthogonal frequency domain multiplexing (OFDM) are two such conventional techniques. Both of these techniques, however, suffer from a potentially large increase in the complexity and cost of the communication system, as well as a potential increase in the power use of the system. Another modulation technique to combat ISI, which offers relatively simple implementation complexity is a DS-SS-based modulation system. Such a system is well adapted to operate in a dispersive channel when a spreading code with good autocorrelation properties is utilized. The autocorrelation function of a spreading code is the function resulting from the correlation of the spreading code with itself, or, more generally, a time series of signed replicas of the spreading code. In discrete time, the function is represented as follows:

$$c(n) = \sum_k w(k)s(k-n)$$

where function s(k−n) is understood to comprise a series of modulation waveforms. A good autocorrelation function exhibits large correlation when the spreading code is correlated at a time offset of zero with respect to the received signal waveform, and a small correlation at other time offsets.

Figure 4:
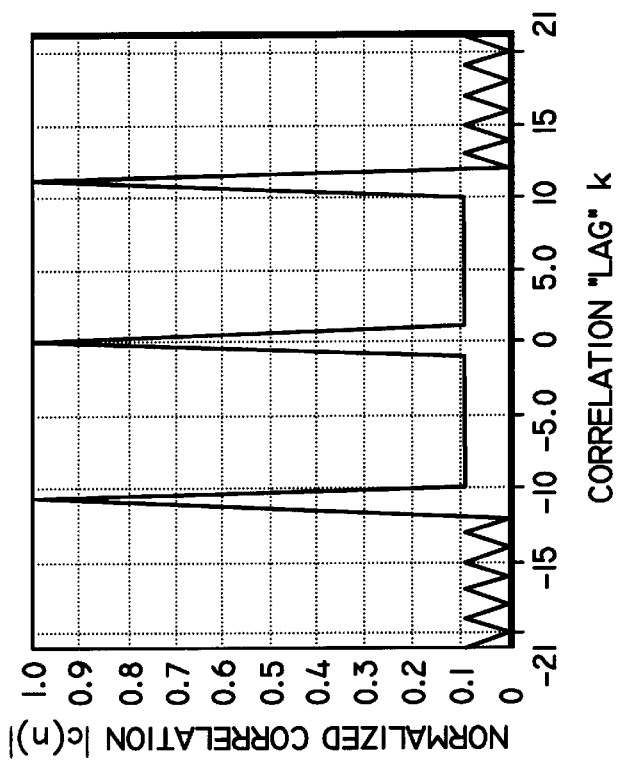
FIG. 4 is a diagram illustrating a discrete autocorrelation function of a Barker code in accordance with the present invention.

One particular class of codes, known as the Barker codes, provide these autocorrelation function characteristics. Referring now to FIG. 4, a diagram illustrating a discrete autocorrelation function of a Barker code is shown. The autocorrelation function shows that the spreading code correlates to a normalized value of 1.0 when not time shifted from the received waveform, and a value of less than 0.1 at all other discrete time offsets. As shown in FIG. 4, the function is computed with a signal vector comprising three waveforms which, consequently, results in three correlation peaks. The advantage of this correlation function when applied to demodulation in a dispersive channel (as illustrated in FIG. 3) is that the code has the ability to reduce the correlation amplitude of interfering time-delayed, scaled replicas of the transmitted signal by approximately a factor of 10. This allows the demodulator to operate in the presence of a large amount of time dispersion distortion.

Also shown in FIG. 4 is that the codes have a limit to the amount of time dispersion which can be handled. Specifically, when the time delay is equal to one full symbol time, the correlation function will peak to 1.0 again, and no multipath rejection can be obtained from the codes. This limits the upper data rate which can be reliably used in a channel with a given amount of time dispersion. An analysis performed by the present inventor of a wide variety of powerline channels has revealed that a symbol rate of 500 ksymbols/second is achievable, which allows a maximum of 2 us of signal delay before the autocorrelation function will peak from the next transmitted symbol in the modulation stream.

Another advantage of the DS-SS system on the powerline is the ability to operate at low signal to noise ratio, which is needed since field measurements taken by the present inventor have indicated that the powerline is corrupted with a large amount of noise. As a result, a DS-SS system, which may run at only 3 dB S/N (Signal power to Noise power ratio), has a large advantage over a non-spread system, such as the conventional BFSK system, which typically needs in excess of 12 dB S/N to function. This operation at low S/N results primarily from the "processing gain" afforded by the spreading code, which is equal to 101 og(N), where N is the length of the spreading code. For N=11, this gain is about 10.4 dB.

A final advantage of the DS-SS system is its low frequency domain power spectral density characteristic. As an example, the 1 Mbit system discussed in detail below spreads its energy over a null-to-null bandwidth of 11 MHz. No single frequency within such range has a high concentration of power. Assuming, by way of example, that the signal energy was spread uniformly over a 5.5 MHz bandwidth, then the power seen in any 1 Hz of bandwidth within this frequency range is only 1/5.5 E6 of the total transmitted power, i.e., 67.4 dB below the total transmitted power. In comparison, a non-spread system concentrates most of its energy in a relatively narrow bandwidth. Hence, a non-spread system exhibits much larger conducted and radiated power spectral density in its frequency band of operation. The low power spectral density of the DS-SS system makes it less prone to interfere with narrowband radio devices that may be operating within its frequency range and is thus well adapted for use on a powerline communication channel.

DS-SS Modulation and the Powerline Interface

As discussed in detail above, the present inventor has determined that a DS-SS modulation technique is well adapted for use as a modulation in a powerline channel, as well as an RF channel. The DS-SS modulation provides excellent resistance to time domain dispersion in communication channels which exhibit large time domain dispersion characteristics such as powerline channels. In addition, the DS-SS technique discussed above obviates the need for a complex equalizer as part of the modulation system. As a result, the DS-SS modulation affords rapid synchronization and allows the use of shorter data packets which are capable of being transmitted through bursts of impulse noise on the powerline.

In a preferred embodiment of the present invention, the baseband modem 30 (shown in FIGS. 1(a) and (b)) implements a direct-sequence spread-spectrum, quadrature phase shift keying (DS-SS QPSK) modulation using a Barker-sequence spreading code applied to each transmitted data symbol. As discussed, the Barker sequences exhibit excellent autocorrelation properties which make the system inherently resistant to time domain dispersion distortion. It is to be understood, however, that the modulation coding scheme of the present invention is in no way limited to Barker-sequence spreading codes, and that any conventional coding sequence may be used which exhibits good autocorrelation properties such that the resulting system has good multipath resistance.

Figure 5:
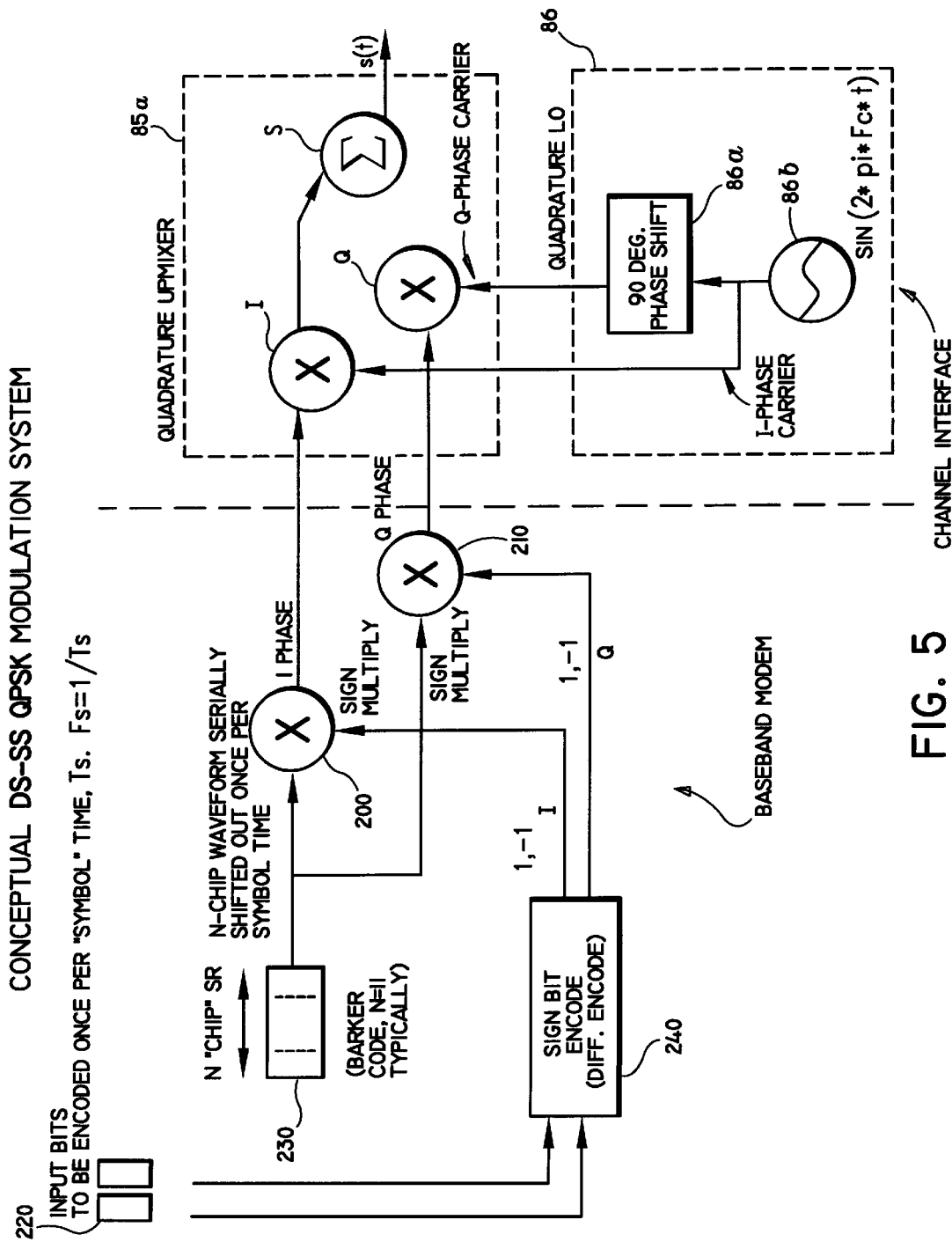
FIG. 5 is a block diagram illustrating a modulation system in accordance with the present invention.

Referring now to FIG. 5, a simplified block diagram of a DS-SS QPSK modulation system in accordance with the present invention is shown. It is to be understood by those of ordinary skill in the art that the block diagram of the modulation system shown in FIG. 5 does not include such obvious components such as sidelobes filters and power amplifier, and merely serves as a conceptual model to provide an overview of the modulation system. Specifically, FIG. 5 illustrates the various modulation steps performed by both the baseband modem 30 and the powerline channel interface (i.e., powerline front end 80) (which are separated by the dotted line). A more detailed discussion of the operation of the powerline channel interface will be provided below with reference to FIG. 7.

Generally, as shown in FIG. 5, the DS-SS QPSK modulation process during a transmission mode begins in the transmitter (modulator) 40 of the baseband modem 30, wherein input data bits 220 are sent to a differential encoder 240 to generate differentially encoded I and Q data. The DS-SS modulation is generated by using a shift register (SR) 230 to "shift out" (i.e., generate) an unsigned spreading code (which is preferably a Barker sequence) at a rate of N "chips" per given symbol period (i.e., all N spreading code values are shifted out over a single symbol period). The term "symbol period" or "symbol rate" is related to the desired data rate of the system. For instance, a 1 Mbit QPSK system encodes two bits per symbol (one bit on the phase of the I carrier and one bit on the phase of the Q carrier), so 2-bit input "symbols" are encoded at a rate of 500,000 symbols per second (i.e., the "symbol rate" of the system is Fs=500 ksym/sec). When a direct-sequence (DS) spreading code is applied to these symbols, the carrier I/Q phases are modulated at a frequency of the symbol rate multiplied by the length of the spreading code. For instance, if a length-11 code is used as the spreading code (i.e., N=11 which is typical for the preferred Barker code), the carrier sinusoids are phase modulated at a rate of 5.5 million times per second (N*Fs). The time interval equal to the symbol period (1/Fs) divided by the length of the spread code (N) is referred to as the "chip" time. Therefore, in a 1 Mbit DS-SS QPSK system, the "chip rate" is 5.5 Mchip/sec. The differentially encoded I and Q data (one bit per channel) output from the differential encoder 240 are multiplied with the unsigned spreading code output from the SR 230 via multipliers 200 and 210, respectively, to form respective signed I-phase and Q-phase modulating signals.

The I-phase and Q-phase modulating signals are then sent to a quadrature upmixer 85a in the powerline channel interface wherein they are, inter alia, mixed with an In-phase sinusoidal carrier via mixer I and a Quadrature-phase sinusoidal carrier via mixer Q, respectively. The I-phase carrier signal is generated by oscillator 86b in a quadrature local oscillator 86 (which is a sinusoidal carrier in the preferred range of 7–10 MHz for transmission on the powerline channel). The Q-phase carrier signal is generated by phase shifter 86a which shifts the sinusoidal signal output from the oscillator 86b 90 degrees in phase. The resulting signals from the I mixer and the Q mixer are sent to a summer module S to form a single composite modulation output signal s(t).

Figure 6:
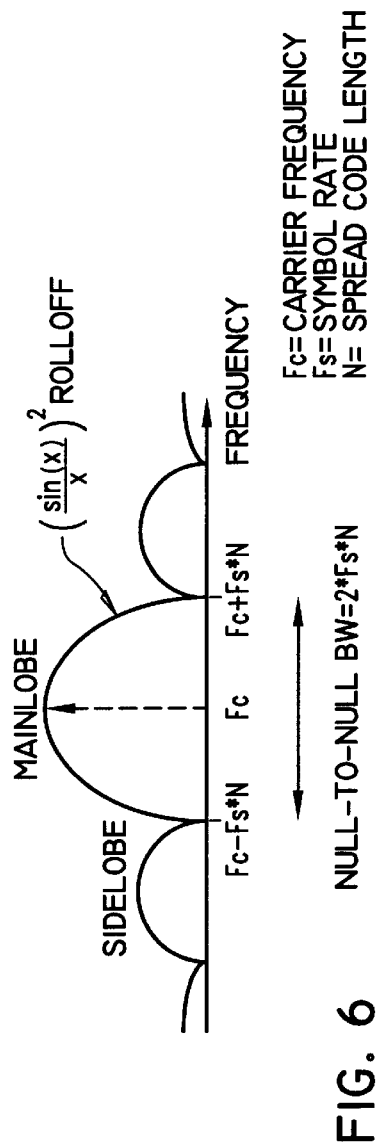
FIG. 6 is a diagram illustrating an example of a power spectrum of the modulation system shown in FIG. 5 in accordance with the present invention.

The resulting power spectrum of the modulation described above is illustrated in FIG. 6. As shown, the resulting power spectrum is a $(\sin(x)/x)^2$ response, with first carrier nulls at Fc–(Fs*N) and Fc+(Fs*N), where (Fs*N) is a frequency offset equal to the system "chip rate". The "null-to-null" bandwidth is twice the system chip rate (i.e., 2*(Fs*N)). As stated above, the preferred modulation system of the present invention would employ a carrier frequency Fc from 7 to 10 MHz, using a chip rate of 5.5 Mchip/sec, which results in a system data rate of 1 Mbit/sec and a null-to-null power spectrum bandwidth of 11 MHz.

Figure 7:
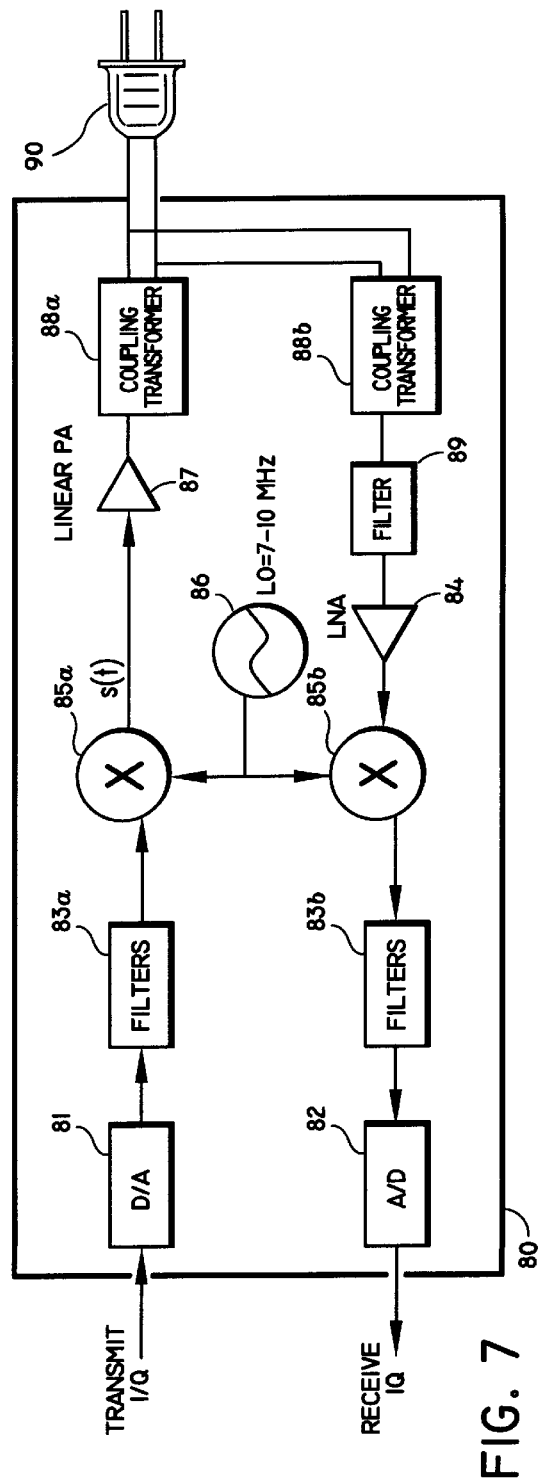
FIG. 7 is a block diagram of a powerline interface shown in FIG. 1(b) which is utilized in accordance with the present invention.

Referring now to FIG. 7, a block diagram illustrates the conventional powerline front end 80 (as shown in FIG. 1(b)) in which the relevant portion of the modulation process described above is implemented. It is to be understood that the architecture of the powerline front end 80 comprises a standard RF heterodyne receiver/transmitter system similar to the RF front end 60 in FIG. 1(a). The main differences are that, instead of coupling to the antenna 70, the transmitted and received signals are coupled onto the powerline channel 90 through a pair of coupling transformers and the LO 86 oscillates at the preferred Fc of 7–10 MHz (as opposed to LO frequency of approximately 2.4 GHz used for transmission in the RF channel).

The powerline front end 80 shown in FIG. 7 provides the interface between the powerline channel 90 (which is typically a 120 VAC outlet) and the baseband modem 30. It is to be understood that FIG. 7 is only a conceptual block diagram, and illustrates the major components which may be used in a typical embodiment of the powerline interface module 80 when it is designed for use with a DS-SS PSK modulation system. In addition, simplifications have been made in FIG. 7. For instance the quadrature mixer 85a (which is shown in detail in FIG. 5) is represented as a single "mixer" symbol. Further, the quadrature LO 86 (also shown in detail in FIG. 5) is represented as a single "oscillator" symbol. In addition, the dual paths for the I and Q baseband signals (which are shown in FIG. 5) are represented as a single path (line). It is to be understood, however, that the intent of the block diagram in FIG. 7 is to illustrate the major functional blocks of a powerline transducer system, and not to detail the functionality of the individual components, all of which are well known in the art.

Referring to FIG. 7, in the transmission mode, the I-phase and Q-phase modulating signals (I and Q signals) that are generated by the baseband modem 30 (as discussed above with reference to FIG. 5) are received by a digital to analog (D/A) converter 81. The I and Q signals sent from the baseband processor 30 (which are typically at transistor-transistor logic (TTL) or complementary metal oxide semiconductor (CMOS) digital logic levels) are then translated by the D/A converter 81 into a bipolar analog signal level. These bipolar analog signals are then filtered by lowpass filters 83*a,* which confine the signal energy to a desired frequency bandwidth. Typically, the lowpass filters 83*a* will have a 3 dB bandwidth of 4.4 MHz when using the preferred 5.5 Mchip/sec modulation rate.

The filtered I and Q signals output from the lowpass filter 83*a* are sent to the quadrature upmixer 85*a* which mixes the filtered baseband I and Q signals with in-phase and quadrature-phase carrier signals, and sums the resulting signals with a summer to form a single composite modulation output signal s(t) (as discussed above with reference to FIG. 5). As discussed above, the modulated carrier signals are provided by the quadrature LO 86, which synthesizes a sinusoidal carrier signal at the preferred Fc of 7–10 MHz (I-phase), as well as another carrier signal shifted 90 degrees in phase (Q-phase). The composite modulation signal s(t) formed at the output of the quadrature upmixer 85*a* is then amplified by a linear poweramp 87 which increases the signal level to provide the desired output power onto the powerline (which typically is a minimum of 100 mW, or 20 dBm). The amplified signal is then transferred to the powerline through coupling transformer 88*a,* which inductively couples the signal onto the powerline, while providing high voltage isolation from the low frequency (60 Hz) 120 VAC powerline signal. It is understood that the powerline front end 80 includes circuitry (not shown) which provides protection from high voltage power surges which may be encountered over the powerline channel.

The receive path starts at the coupling transformer 88*b* which picks up a transmitted modulation signal from the powerline channel 90 (e.g., 120 VAC line). Since the powerline signal typically is distorted with a large amount of unwanted noise across a wide frequency range, it is necessary to use a bandpass filter 89 to pass only the desired frequency band which contains the transmitted signal. For instance, in the preferred embodiment with a 1 Mbit/sec DS-SS QPSK system centered at 8 MHz, the frequency band from approximately 3.6 MHz to 12.4 MHz will be passed, and all other frequencies blocked. After the signal is bandlimited, it is passed through a low noise amplifier (LNA) 84 which provides the necessary signal gain for system operation. After amplification, the signal is passed to a quadrature downmixer 85*b* which mixes the received composite I/Q modulation signal with the output of the quadrature LO 86.

The quadrature downmixer 85*b* outputs baseband I and Q signals, which are further processed by lowpass filter 83*b* to remove unwanted noise distortion. Finally, the baseband I and Q signals are converted to a digital representation by a dual analog-to-digital (A/D) converter 82. Typically the A/D converter 82 will sample the I and Q signals at a rate of twice the "chip rate" of the system. For example, the preferred 1 Mbit/sec DS-SS QPSK system using length 11 spread codes described above results in a 5.5 Mchip/sec "chip rate". The dual A/D converter 82 then samples the baseband I/Q signals at a rate of 11 Msample/sec. The resulting digital Receive IQ samples are sent to the demodulator 50 in the baseband modem 30 (shown in FIG. 1), which de-spreads and demodulates the received signal.

Figure 8:
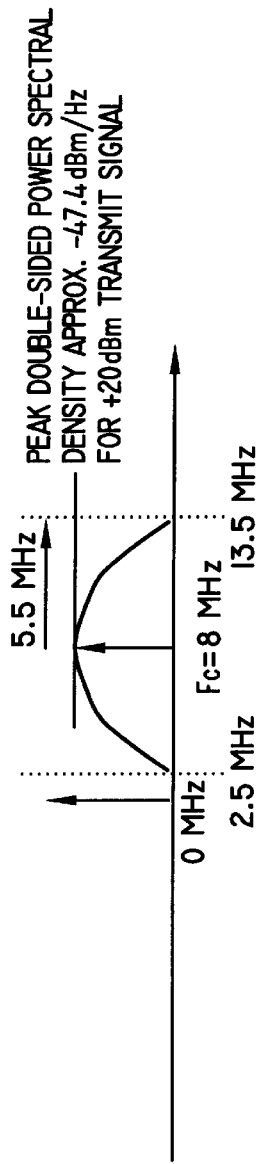
FIG. 8 is a graphical illustration of frequency use on a powerline for a preferred modulation system in accordance with the present invention.

As discussed above for the transmission mode of operation, after spreading the baseband signal with the preferred length-11 Barker sequence in the transmission mode, the resulting chip rate is 5.5 Mchips/sec. The resulting spectrum of the baseband signal exhibits a null-to-null bandwidth of 11 MHz, which can be placed on the powerline channel at a center frequency Fc of approximately 8 MHz. Referring to FIG. 8, a diagram illustrating the resulting spectral density on the powerline channel with the preferred modulation system is shown. It is to be understood that FIG. 8 is similar to FIG. 6 except for the sidelobes shown in FIG. 6 which are suppressed via the filtering process. When transmitting a signal onto the powerline at a level of +20 dBm, the peak power spectral density is approximately −47.4 dBm/Hz, which is 67.4 dB below the total transmitted power as discussed above. This low power spectral density represents a large advantage over a narrowband system transmitting at +20 dBm, which essentially confines all of its power to a narrow frequency band and, as such, exhibits a high power spectral density which results in the potential problem of interfering with radio broadcasts or any electronic equipment which may be attached to the powerline. Further, by using a length-11 code sequence to spread the (QPSK) modulation, the system provides approximately 10.5 dB of processing gain, which, as stated above, results in a S/N ratio of approximately 3 dB to run with low block error rate.

Modular Home-Networking System

Figure 9:
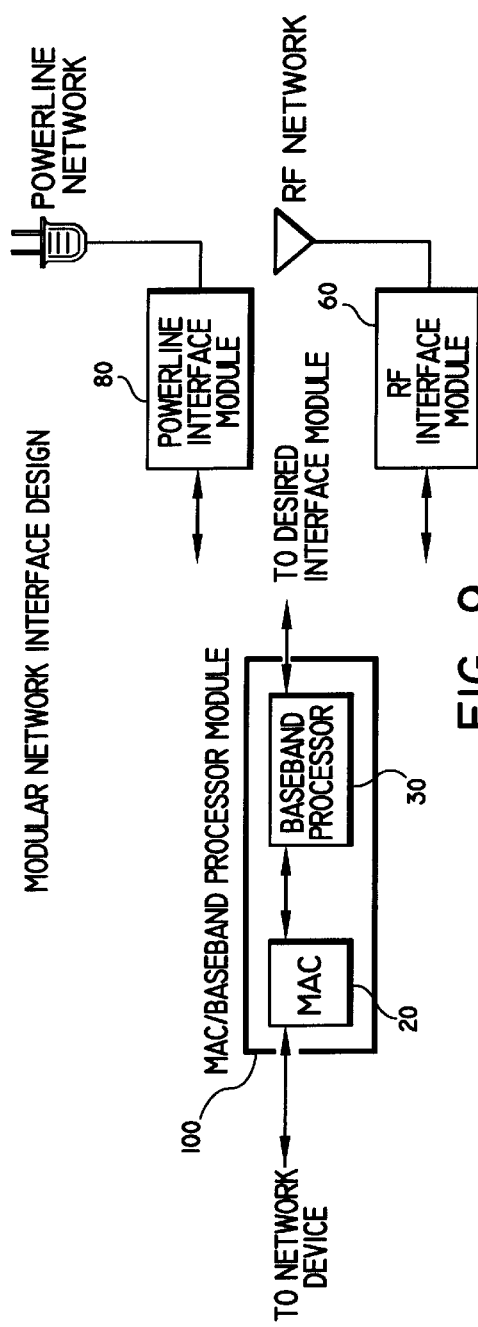
FIG. 9 is a block diagram of a modular network interface in accordance with the present invention.

It is to be appreciated that, by employing the preferred Barker-code spreading sequence in the DS-SS modulation scheme (which, as discussed above, is suited for both powerline and RF transmission), a modular home-networking system may be designed by providing a single MAC/baseband processor unit which can attach to either a RF interface unit or powerline interface unit. Referring now to FIG. 9, a block diagram illustrating the concept of a modular network interface in accordance with the present invention is shown. A MAC/baseband processor unit 100 is provided which incorporates both the MAC unit 20 and the baseband processor 30, which are shown in FIGS. 1(*a*) and (*b*). Advantageously, since the MAC protocol is identical for both the wireless and powerline networks, the MAC/baseband processor 100 may be connected to a powerline interface module 80 or an RF interface module 60 depending on whether the user wants to transmit network data over a powerline channel or an RF channel, respectively.

Figure 10:
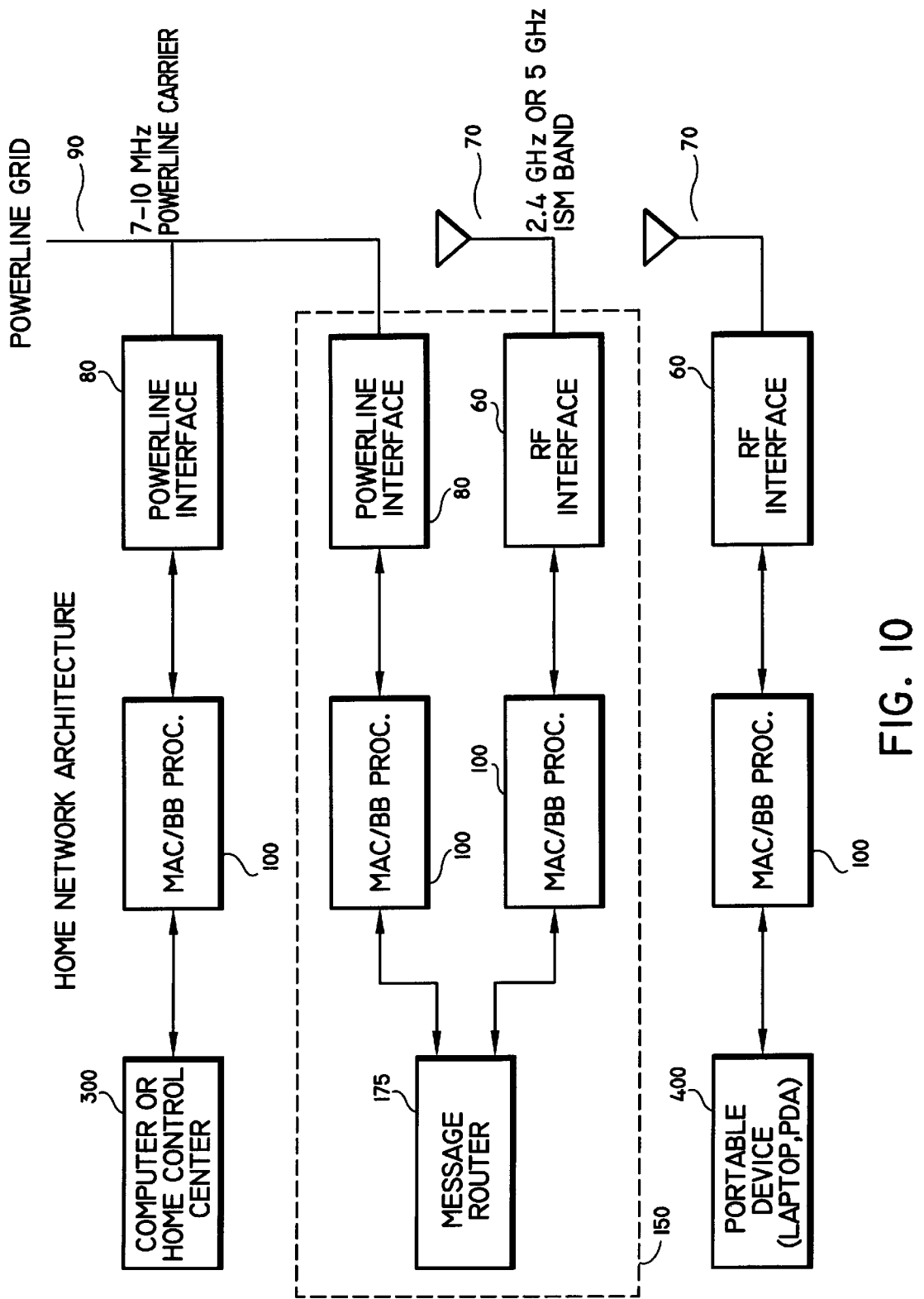
FIG. 10 is a block diagram of a home network architecture using a common modulation system for both RF and powerline channels in accordance with the present invention.

Referring now to FIG. 10, a block diagram is shown of an embodiment of a modular home network architecture using a common modulation system for both RF and powerline channels in accordance with the present invention. The modular network system includes a plurality of MAC/baseband processor units 100, each being interfaced with a corresponding network device such as a computer 300 (or home control center) and a portable (i.e., wireless) network device 400 such as a laptop computer or personal digital assistant. As shown, the system architecture forms a backbone network on the conventional powerline grid 90 of, e.g., a residential home, which enables wireless connectivity to the powerline network 90 through a network bridge 150 (or "access point") for a plurality of portable (i.e., wireless) network devices such as a laptop and PDA. For transmission over the powerline network 90, the MAC/baseband processor unit 100 (which is interfaced to a corresponding network device) is connected to a powerline interface 80. Similarly, for transmission over the RF network via the antenna 70, the MAC/baseband processor unit 100 (which is interfaced to a corresponding portable network device) is connected to an RF interface 60. As stated above, the same driver software and physical hardware may advantageously be utilized in each of the baseband processor/MAC units 100 for interfacing to each of the network devices 300 and 400 that are being used.

The network bridge 150 is used for routing messages between the powerline and RF channels. The "RF portion" of the network bridge 150 includes a MAC/Baseband processor unit 100 and an RF interface unit 60 and the "powerline portion" of the network bridge 150 includes a MAC/Baseband processor unit 100 and a powerline interface unit 80. The "RF portion" and the "powerline portion" of the network bridge 150 are operatively connected to each other via a message router 175 The message router 175 functions as an intelligent router of messages that are received from both the powerline and wireless networks. For instance, the message router 175 may forward messages received on the powerline to the RF network, and vice versa.

It is to be appreciated that the functionality of the network bridge 150 may be incorporated into a central intelligent controller having data processing capabilities. For instance, a desktop computer or home control center which connects to both the RF and powerline physical networks could provide both user interface functions and network bridge functionality. It is to be further appreciated that the same MAC/baseband unit 100 may be used for both the RF and powerline portions of the network bridge since the MAC protocol for the modular network system is identical for both the RF network and the powerline networks. Further, by utilizing the dual MAC/Baseband processor units, the network bridge 150 allows the powerline and RF networks to run at different physical data rates.

It is to be understood that the architecture shown in FIG. 10 illustrates one implementation of the modular home network system in accordance with the present invention. One of ordinary skill can envision various ways to implement the modular system of the present invention. For instance, the modular system may be configured such that a network system may be established between network devices connected to the powerline grid of two or more residential homes. In such a configuration, a network bridge 150 connected to the powerline grid of one home would transmit and receive RF signals to and from a network bridge 150 attached to the powerline grid of another home, thereby establishing a communication link between network devices operating on the powerline grids of different residences.

In summary, the modular home-networking communication system of the present invention affords the end user a large degree of configuration flexibility by enabling the home network to simultaneously operate on the powerline infrastructure of a house or a radio frequency. The modular system design, which separates the MAC/baseband processor unit 100 from the RF interface units 60 and the powerline interface units 80, allows the same MAC/baseband processor unit 100 to be utilized in all home network devices. Further, the ability to simply interchange the interface unit from powerline to RF provides a flexible configuration and network.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A network communications system, comprising:

a network device;

a plurality of channel interface units for operatively interfacing said network device to one of a plurality of disparate communication channels, each of said plurality of channel interface units being operatively compatible with a corresponding one of said plurality of disparate communication channels;

a baseband modem, interchangeably connectable to any one of said plurality of channel interface units, for encoding and decoding data transmitted between said network device and one of said plurality of disparate communication channels, wherein said baseband modem is operatively compatible with each of said plurality of disparate communication channels; and a MAC (media access control) processor, operatively connected between said network device and said baseband modem, for controlling the transfer of data between said network device and said baseband modem, wherein said MAC processor is operatively compatible with each of said plurality of disparate communication channels.

2. The communications system of claim 1, wherein said plurality of disparate communication channels includes a radio frequency (RF) communication channel and a powerline communication channel.

3. The communications system of claim 1, wherein said baseband modem comprises a direct-sequence, spread-spectrum modulation with spreading codes.

4. The communications system of claim 3, wherein said spreading codes comprise Barker-sequence codes.

5. The communications system of claim 3, wherein said plurality of disparate communication channels includes a powerline communications channel and an RF communications channel.

6. The communications system of claim 1, wherein said MAC processor and said baseband modem are combined into a modular MAC/baseband processor unit, said modular MAC/baseband processor unit being operatively compatible with each of said plurality of disparate communication channels, and said modular MAC/baseband processor unit being interchangeably connectable to each one of said plurality of channel interface units so as to provide communication between said network device and said corresponding one of said plurality of disparate communication channels.

7. A modular home-network communications system, comprising:

a plurality of network devices, said network devices being operatively connected to each other through a plurality of disparate communication channels, each of said plurality of disparate communication channels being associated with one of said plurality of network devices;

a plurality of channel interface units, for operatively interfacing one of said plurality of network devices associated therewith to a corresponding one of said plurality of disparate communication channels, each of said plurality of channel interface units being functionally compatible with a corresponding one of said plurality of disparate communication channels;

a plurality of media access control (MAC)/baseband processor units, at least one of said plurality of MAC/baseband processor units being operatively coupled between each one of said plurality of network devices and said associated interface unit, each one of said plurality of MAC/baseband processor units comprising modulation/demodulation means for encoding and decoding signals transmitted between said corresponding network device and said corresponding communication channel, said modulation/demodulation means being operatively compatible with each of said plurality of disparate communication channels; and media access protocol means for controlling the transfer of data between said corresponding network device and said corresponding interface unit, said media access protocol means being operatively compatible with each of said plurality of disparate communication channels; said modulation/demodulation means and said media access protocol means being identical in each of said plurality of MAC/baseband processor units; and inter-channel interface means, operatively connected between each of said plurality of disparate communication channels, for routing messages between each of said plurality of disparate communication channel to establish a communication link between said network devices operating in a different one of said plurality of disparate communication channels.

8. The communications system of claim 7, wherein said plurality of disparate communication channels includes one of a single powerline communications channel and a plurality of powerline communication channels and one of a single RF communications channel and a plurality of RF communications channels.

9. The communication system of claim 8, wherein data is transmitted on said powerline communication channels with a center frequency in the range of about 7 MHz to 10 MHz.

10. The communications system of claim 1, wherein said baseband modem is a modular component.

11. The communications system of claim 2, wherein data is transmitted on said powerline communication channel with a center frequency in the range of 7 MHz to 10 MHz.

12. An access device for providing access to a communications system, comprising;

a plurality of channel interface devices, wherein each channel interface device is operatively coupled to a corresponding one of a plurality of disparate communication channels;

a plurality of MAC/baseband processors, wherein each MAC/baseband processor is operatively coupled to at least one of the channel interface devices, and wherein each of the MAC/baseband processors employs a similar modulation/demodulation process; and a router, operatively connected to each of the MAC/baseband processors, for routing data between the disparate communication channels.

13. The access device of claim 12, wherein the modulation/demodulation process comprises a direct-sequence, spread spectrum modulation.

14. The access device of claim 13, wherein the direct-sequence, spread spectrum modulation utilizes Barker-sequence spreading codes.

15. The access device of claim 12, wherein the disparate communication channels comprise a powerline channel and an RF communications channel.

16. The access device of claim 12, wherein the MAC/baseband processors are modular.

17. The access device of claim 12, wherein the access device is implemented in a modular home-networking communications system.

* * * * *